(12) United States Patent
Melvin, Jr. et al.

(10) Patent No.: US 8,704,630 B2
(45) Date of Patent: Apr. 22, 2014

(54) APPARATUS AND METHODS FOR TEMPERATURE-BASED CONTROL OF COMMUNICATION DEVICE OPERATIONS

(75) Inventors: Charles W. Melvin, Jr., Dudley, GA (US); Robert Bryan Seal, Meridian, MS (US); Michael Dempsey, Madison, MS (US); Tyler Charles Poschel, Brandon, MS (US); Jacob Ryan Magee, Silver Creek, MS (US)

(73) Assignee: Itron, Inc., Liberty Lake, WA (US)

( * ) Notice: Subject to any disclaimer, the term of this patent is extended or adjusted under 35 U.S.C. 154(b) by 795 days.

(21) Appl. No.: 12/899,472

(22) Filed: Oct. 6, 2010

(65) Prior Publication Data

US 2012/0050000 A1 Mar. 1, 2012

Related U.S. Application Data

(60) Provisional application No. 61/377,040, filed on Aug. 25, 2010.

(51) Int. Cl.
G05B 23/02 (2006.01)

(52) U.S. Cl.
USPC ............ 340/3.1; 340/655; 219/201; 219/209; 219/490; 219/494; 713/300

(58) Field of Classification Search
USPC ........... 340/3.1, 655; 219/201, 209, 210, 482, 219/490, 494, 538, 542, 543; 713/300
See application file for complete search history.

(56) References Cited

U.S. PATENT DOCUMENTS

| | | | |
|---|---|---|---|
| 4,374,316 A | 2/1983 | Inamori et al. | |
| 5,645,123 A | 7/1997 | Doi et al. | |
| 5,854,904 A * | 12/1998 | Brown | 710/100 |
| 5,896,259 A | 4/1999 | Farwell et al. | |
| 6,114,674 A | 9/2000 | Baugh et al. | |
| 6,127,660 A * | 10/2000 | Scafati | 219/486 |
| 6,209,631 B1 | 4/2001 | Garcia-Ortiz | |
| 6,621,055 B2 | 9/2003 | Weber et al. | |
| 6,781,056 B1 | 8/2004 | O'Rourke et al. | |
| 6,900,411 B2 | 5/2005 | Norton et al. | |
| 7,335,855 B2 | 2/2008 | von der Luhe et al. | |
| 7,680,622 B2 * | 3/2010 | Dupuy et al. | 702/132 |
| 8,445,818 B2 * | 5/2013 | Marcus et al. | 219/209 |

FOREIGN PATENT DOCUMENTS

KR 20020066616 8/2002

* cited by examiner

*Primary Examiner* — Andrew Bee
(74) *Attorney, Agent, or Firm* — Hanley, Flight & Zimmerman, LLC

(57) ABSTRACT

In one or more embodiments, an intelligent communications device is disclosed. In one embodiment, an apparatus is disclosed for controlling the operations of temperature-sensitive electronic devices in an enclosure, based on a requisite temperature range. The apparatus includes a main circuit board with a plurality of secondary circuit board connectors that are operative to connect secondary circuit boards to the main circuit board. The apparatus also includes one or more temperature sensors that are operative to sense temperature within the enclosure, and one or more selectively actuatable heating elements that are mounted to the main circuit board in proximity to the plurality of secondary circuit board connectors. Each heating element is operative to emit heat when actuated. The apparatus further includes a programmable processor that is programmed to cause the temperature sensors to sense the temperature within the enclosure and, if the sensed temperature is above or below the requisite temperature range, selectively actuate or shut down at least one of the heating elements.

38 Claims, 10 Drawing Sheets

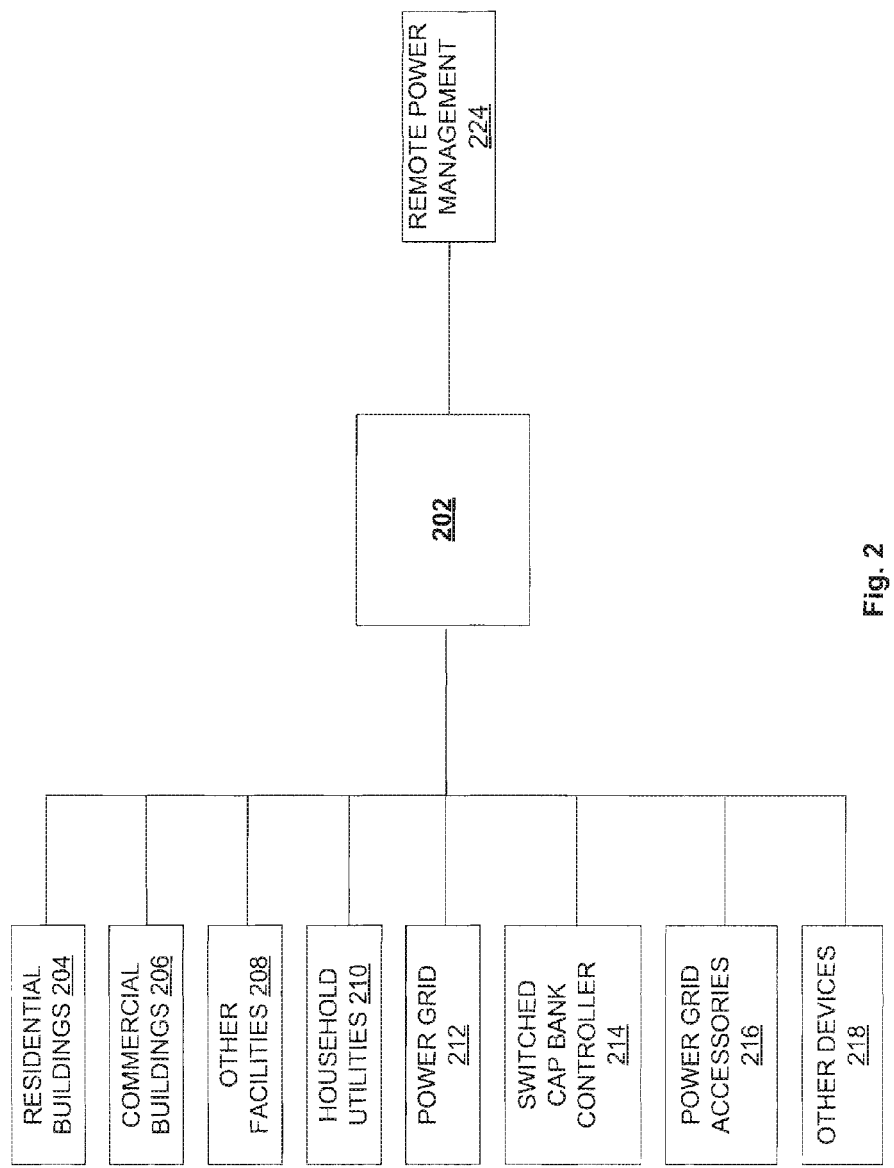

APPARATUS AND METHODS FOR TEMPERATURE-BASED CONTROL OF COMMUNICATION DEVICE OPERATIONS

CROSS REFERENCE TO RELATED PATENT APPLICATION

This application claims the benefit, pursuant to 35 U.S.C. §119(e) of U.S. provisional Application Ser. No. 61/377,040, filed Aug. 25, 2010, entitled "Apparatus for Temperature-Based Control of Communication Device Operations" by Charles W. Melvin, Robert B. Seal, Michael Dempsey, Tyler C. Poschel, and Jacob R. Magee, the disclosure for which is hereby incorporated by reference in its entirety.

FIELD OF THE INVENTION

The present invention pertains generally to network routers, and more specifically to an intelligent communications device for a smart grid, hereinafter also referred to as an "apparatus" or "network apparatus", for managing interconnection of various electrical devices and facilities.

In one aspect, the present invention relates to temperature-sensitive electronic devices, and in particular to controlling temperature and operation of electronic devices in extreme environmental conditions.

BACKGROUND OF THE INVENTION

Various electronic devices can be mounted on a motherboard or a printed circuit board. In recent years, it has been observed that a number of electronic devices configured inside various types of enclosures exhibit poor performance when exposed to extreme temperature conditions, such as when installed in outdoor locations.

Among other needs, there exists a need for an apparatus and methods of controlling operations of temperature-sensitive electronic devices based on an overall temperature within an enclosure and/or temperature detected at one or more particular locations relative to selected electronic devices that are operable within the enclosure.

SUMMARY OF THE INVENTION

In one aspect, the present invention relates to a system and method for controlling operation of a plurality of electronic devices in a smart grid. In one or more exemplary embodiments, an intelligent communications device is operatively connected with other devices and/or systems and one or more electrical distribution networks. One or more of these electronic devices may work in collaboration with the intelligent communications device in a smart grid network infrastructure. In one or more embodiments, the electronic devices may be arranged in various configurations to operate in networks such as LAN, WAN, and/or HAN networks.

In one embodiment, the intelligent communications device is configured with other devices and/or monitoring equipment for monitoring and management of electrical energy consumption. The intelligent communications device operates on wireless communications networks and according to one or more wireless protocols such as commercial cellular, Bluetooth, and/or 802.11.

In one embodiment, the intelligent communication device is field upgradable, and is configured such that additional hardware can be installed for enabling new protocols or technologies to be developed. The intelligent communications device is operative to implement open source software configured to facilitate integration of different types of devices with additional circuitry and/or hardware. Further, the intelligent communications device is operable to update the open source software periodically or at a pre-defined time.

Embodiments of the present invention provide one or more actuating members for activating/deactivating a power supply to at least one of the plurality of circuit boards and for detecting a security breach in an intelligent communication device operating in a smart grid. The intelligent communication device may include a power supply circuit board and a plurality of other circuit board. A first actuating member may disable power to at least one of the plurality of circuit boards while maintaining power supply to at least one of the plurality of other circuit boards. In this aspect, the intelligent communication device may be fully operative; the operations corresponding to one of the plurality of circuit boards isolated by enabling the first actuating means remain suspended. The plurality of other circuit boards is enclosed in a utility grade enclosure hinged to a detachable cover. A second actuating member associated with the detachable cover is associated with detachable cover, which may sound an alert, when an unauthorized person removes a detachable cover.

BRIEF DESCRIPTION OF THE DRAWINGS

FIG. 2 depicts various facilities, devices and equipment interfaced with an intelligent communications device according with one embodiment of the present invention.

DETAILED DESCRIPTION OF THE INVENTION

Description of the various embodiments detailed below is for understanding the invention. It will be understood that the invention is not limited to the particular embodiments described herein, but is capable of various modifications, rearrangements and substitutions, which will now become apparent to those skilled in the art without departing from the scope of the invention. Therefore, it is intended that the following claims cover all such modifications and changes that fall within the spirit and scope of the invention.

In alternative embodiments, system, process, and apparatus may include additional, fewer, or different components. In addition, the each component may include additional modules, software, and interface devices that may be appended on requirement to operate the present invention in alternate embodiments.

Figure 1:
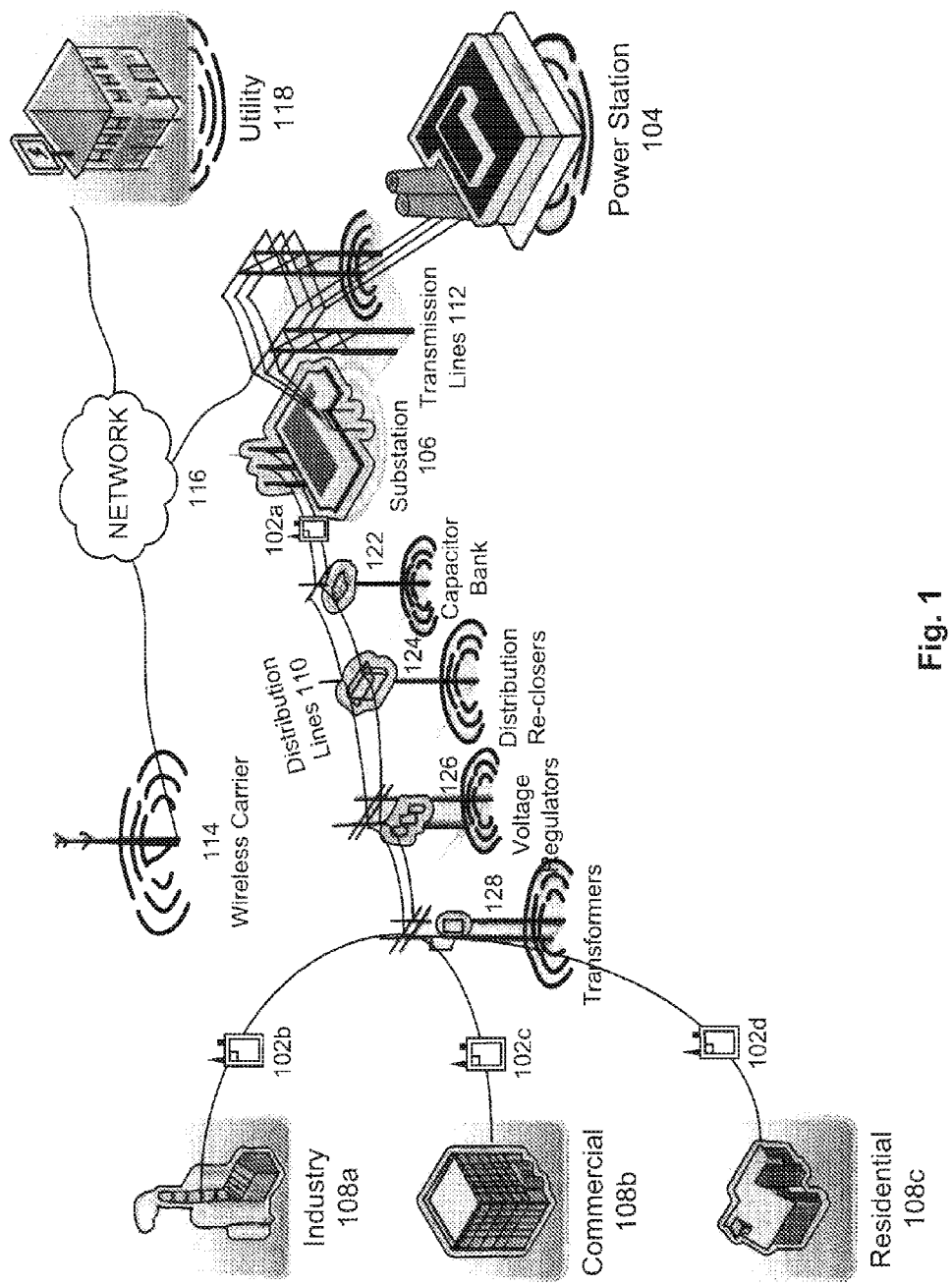
FIG. 1 is a schematic illustration of an overall environment in which one or more aspects of the present invention can be practiced.

Referring to FIG. 1, an intelligent communications device for a smart grid communicatively coupled to a plurality of devices and/or facilities for management of energy requirements is depicted. Integration of the intelligent communications device 102 into the smart grid infrastructure may be performed using minimal capital expenditure.

FIG. 1 illustrates an environment in which the present invention may be practiced. The environment may include a plurality of electrical generation facilities such as thermal power plants, hydro-based power plants (dams, for example), solar powered electricity generation units, and wind powered electricity generation units. Various electricity-generating plants are collectively referred to as power generation units 104. The electricity generated from the power generation units 104 may be distributed through a plurality of high voltage transmission lines 112 to a substation 106. For example, high voltage electricity may be distributed via plurality of towers and a plurality of medium voltage distribution cables 110.

By way of example and not a limitation in one implementation, the substation 106 may receive power from the plurality of high voltage transmission lines 112 from at least one of the plurality of substations such as power station 104. Further, the substation 106 may be associated with an intelligent communications device 102. The intelligent communications device 102 may monitor various parameters such as quality of electricity and electrical load.

The substation 106 may then distribute low voltage electricity to residential entities 108c, industrial entities 108a, and/or commercial entities 108b. The medium voltage distribution lines 110 may include attachments of various devices for improvement of quality electricity. As such, the plurality of distribution lines 110 may run moderate distances and are affected by cable resistance, electrical grid loading, and other factors which constantly effect the operation and efficiency of the electric grid. In order to compensate for a variety of operating conditions, the plurality of distribution lines 110 may include connections to capacitor banks 122, distribution re-closers 124, voltage regulators 126, transformers 128 and other types of equipment.

The electricity may be supplied to the one or more industrial entities such as industry 108a, via intelligent communications device 102b. Likewise, the plurality of distribution lines 110 may feed electricity to one or more commercial entities such as commercial entity 108b, one or more residential entities 108c, through intelligent communications devices 102c and 102d. Hereinafter, intelligent communications devices 102a, 102b, 102c, and 102d may be collectively referred to as "intelligent communications device 102."

The intelligent communications device 102 may be configured to operate with a central control station, regulatory authority, audit compliance authority, and/or electrical monitoring systems. Apart from monitoring the various parameters such as electrical quality, the intelligent communications device 102 may be coupled wirelessly to a plurality of wireless carriers such as 114. Alternatively, the intelligent communications device 102 may be coupled with communications network 116 using powerline communication. Further, the wireless carrier 114 may receive signals that may be utilized for moderating the distribution of electricity from the substation 106 to industrial entity 108a, commercial entity 108b, and/or residential entity 108c.

The intelligent communications device 102 may be connected with a plurality of utilities in a building, a commercial complex, and/or an industry. By way of example and not a limitation, in one implementation, intelligent communications device 102 may be connected to utility 118. In an embodiment, the utility 118 may include lighting systems, refrigerators, air conditioners, computers, televisions, home theaters, electric irons, water filters, air filters, air compressors, and/or vacuum cleaners. The intelligent communications device 102 may directly control the utility 118. In another embodiment, one or more intelligent communications devices 102 may indirectly control the utility 118. In yet another embodiment, the utility 118 may be partially controlled by one or more intelligent communications devices 102 for modulating the electrical consumption. It may be noted that only one implementation is provided; however, those skilled in the art would appreciate that various other implementations are possible without deviating from the scope and spirit of the invention.

The utility may be grouped into essential and non-essential electrical equipment for purposes of control. In this embodiment, the intelligent communications device 102 may be programmed to monitor the one or more utilities 118 on a rule based program.

In an embodiment of the present invention, the intelligent communications device 102 may be coupled to multiple consumers such as industrial entities 108a, commercial entities 108b, and residential entities 108c. The consumer 108a, 108b, and 108c may be hereinafter collectively referred to as 'consumers 108'. The intelligent communications device 102 may facilitate management of electricity to one or more consumers 108. Additionally, the intelligent communications device 102 may also be integrated to communications backhaul providers that may work in synchronization for accumulating data related to electrical consumption, load distribution, quality of electricity, power factor, and/or failure of equipment associated with the distribution of electricity. The information may be communicated to control and monitoring station, either through the network 116 or through wireless carriers 114.

In an embodiment of the present invention, the consumers 108 may be distributed in a geographically area and may be connected to each other through a smart grid. In addition, each consumer 108a may have one or more smart appliances. The smart appliances may be managed by the intelligent communications device 102 for optimizing electricity consumption.

Referring to FIG. 2 an arrangement of configuring various electrical facilities with an intelligent communications device 202 is shown, according to one embodiment of the present invention. The intelligent communications device 202 may communicate with the plurality of devices and/or facilities, such as but not limited to, residential buildings 204, commercial entities 206, other facilities 208, household utilities 210, power grids 212, switched cap bank controllers 214, grid accessories 216, other devices 218, and remote power management utilities 224. Other facilities 208 may include but not limited to schools, small offices, sports complexes, shops, malls, federal offices, utility complexes, or other types of buildings having electrical connection and consuming electricity. The intelligent communications device 202 may facilitate energy management for one or more of the devices and/or facilities as shown.

Power Management

In an embodiment of the present invention, the intelligent communications device 102 may enable distribution companies to reduce the overall power requirement through better management. This in turn may help in reducing the need for power generation thereby reducing environmental damage.

Further, the intelligent communications device 102 may act as a communications hub for monitoring electrical usage, power consumption, quality of electricity, and/or analysis of electrical load, where examples of load type may include inductive load and/or capacitive load. The communications hub may interface various devices in order to monitor electricity consumption and/or power usage.

The intelligent communications device 102 may enable integration of various utilities with the grid for optimizing the overall performance of the system. For example, the load requirement of a particular building may be assessed/monitored using the intelligent communications device 102. The data collected by the intelligent communications device 102 from the various utilities may be utilized for improving the overall electrical consumption of these utilities thereby saving cost and electricity. Alternatively, the intelligent communications device 102 may monitor the performance of different electrical utilities and may facilitate their management in an optimized way.

In another embodiment, the intelligent communications device 102 may be utilized by distribution companies for monitoring the quality of electricity and load characteristics for a specific area. The data recorded by the intelligent communications device 102 may be utilized for increasing the operational efficiency of the power grid.

In another embodiment, the intelligent communications device 102 may facilitate management of demand response for a grid. Currently, power generation and/or power distribution companies face pressure to reduce load either electronically or manually. In such settings, transmission grid operators use demand response to request load reduction in order to manage demand. One or more aspects of the present invention according to this exemplary embodiment allow for transmission grid operators to utilize the intelligent communications device 102 for electronically managing the demand response of electricity.

Integration with Power Grid

In one embodiment, the intelligent communications device 102 may include a communication module for connecting it with a smart grid. In this aspect, the intelligent communications device 102 may increase the performance of the smart grid making it more adaptable and cost effective. In addition, the intelligent communications device 102 may enable utilities to interface with the grid irrespective of the underlying technology, network, or assets. The intelligent communications device 102 may be flexible to accommodate any configuration changes and/or bandwidth changes without affecting the underlying architecture/technology.

In another embodiment of the present invention, the intelligent communications device 102 may communicate with other apparatuses. The communication may be either wireless or through wired connection. Such communication may occur in response to a critical event such as power surge, excess demand, low power factor, when immediate action is required for safeguarding the electrical equipments associated with transmission infrastructure. In another embodiment, the communication between different apparatuses may occur on a continuous basis for optimizing the performance of the system.

Field Upgradability

In another aspect of the present invention, the intelligent communications device 102 may be field-upgradable and may provide field replaceable units for preventing obsolescence. The intelligent communications device 102 may allow utilities to add multiple communication technologies to the smart grid communication infrastructure with change of the underlying technology. By integrating multiple communication technologies, the intelligent communications device 102 may act as a universal hub, to reduce the cost of purchasing additional equipment for implementing multiple network communications protocols. Consumers 108 may integrate multiple appliances and multiple communication technologies using intelligent communications device 102 thereby reducing the total cost of ownership of the equipment. Additionally, consumers 108 may upgrade the intelligent communications device 102 to integrate new communication protocols by just installing additional circuitry without changing existing equipment.

The intelligent communications device 102 may further include a software update module that may connect to the Internet for availability of firmware updates. In response to availability of firmware updates, the software update module may back-up the current firmware before upgrading the intelligent communications device 102 with the new firmware. Failure to implement the new firmware may result in reinstallation of the old firmware from the back up.

In another embodiment of the present invention, the intelligent communications device 102 may include additional slots for inserting PCB boards. These PCB boards may include circuitry for enabling specific protocol, for example, the PCB on PCB board may implement EDGE protocol. Similarly, in another example, a PCB board may implement WiMax protocol. Field service personnel may insert additional PCB boards for upgrading the existing communication protocol without having to replace the intelligent communications device 102. Thus, the intelligent communications device 102 may be upgraded while in operation.

In another embodiment of the present invention, the intelligent communications device for a smart grid may include PCB boards supporting various communication technologies such as but not limited to, WiMax, EDGE, IPv4/IPv6, Bluetooth, Infrared, broadband over powerline, and Ethernet. Software configured in the intelligent communications device 102 may be utilized to enable/disable one or more communication boards. Thus, in one implementation, the apparatus may support Ethernet. In another implementation, the intelligent communications device 102 may support Ethernet and Bluetooth. In these scenarios, the field service personnel may update the intelligent communications device 102 by enabling the boards supporting various communication technologies remotely.

In yet another embodiment of the present invention, the intelligent communications device 102 may include utilities, circuitry for upgrading it on site. Further, the intelligent communications device 102 may include software and/or modules for adding multiple communication technologies to the smart grid communications infrastructure based on future needs without having to replace an entire system backbone. By virtue of having capabilities for adding new devices and facilities, the intelligent communications device 102 may allow consumers to purchase and integrate non-interoperable proprietary technologies from multiple vendors. Vendors may integrate heterogeneous devices using intelligent communications device 102 thereby creating an open environment. In this aspect, the intelligent communications device 102 may allow for consumers to avoid being committed to a specific vendor.

Consumption Monitoring

Consumers of electricity may save money by planning their energy requirements in area implementing Time-Of-Use (TOU) pricing. Consumers may plan the use of electrical appliances in off-peak hours, when the cost of electricity is less, for reducing the total cost of electricity consumption. The intelligent communications device 102 may facilitate the reduction in total consumption of electricity by automatically switching on the electrical appliances in non-peak hours.

Network Protocol Implementation

The intelligent communications device 102 may be based on Internet Protocol (IP) thereby providing seamless integration with different type of networks. For example, the intelligent communications device 102 may facilitate communication with both public and private networks. In embodiments, the network may be either a wired network or a wireless network. Further, networks classified on the basis of scale, such as LAN, WAN, HAN, or functional relationships, such as client server, peer-to-peer, and/or active networks, overlay networks are included within the scope the invention. In an exemplary embodiment, the intelligent communications device 102 communicates using TCP/IP. Likewise, the intelligent communications device 102 may interface with other devices implementing conventional protocols.

The intelligent communications device 102 may facilitate smart grid-enabled appliances to communicate wirelessly with electrical distribution companies to manage their overall consumption of electricity. For example, the intelligent communications device 102 may manage consumption of electricity during peak hours for a distribution network. In this aspect, the intelligent communications device 102 may communicate in real-time with various facilities and other devices to optimize energy efficiency.

In an embodiment of the present invention, the intelligent communications device 102 may include an Ethernet interface for connecting it with external network such as LAN, WAN, or HAN. Further, the Ethernet interface may enable communication with Internet thereby facilitating remote management of utilities. The intelligent communications device 102 may record various parameters such as electricity consumption, power usage and may transfer the recorded data to the remote infrastructure management facility for optimization of the electrical consumption. To this end, the intelligent communications device 102 may enable optimum utilization of the grid infrastructure. The intelligent communications device 102 may be built for outdoor use and may be protected from environmental hazards.

The intelligent communications device 102 may be capable of interfacing with various protocols, networking standards, and other specifications. In an example, the intelligent communications device 102 may facilitate communication by implementing WiMax protocol. In another example, the intelligent communications device 102 may communicate using Bluetooth protocol. In embodiments, the intelligent communications device 102 may communicate using other protocols such as but not limited to token ring, EDGE, UDP, datagram and other proprietary Internet communications protocols. In an example, the intelligent communications device 102 may facilitate communication with ZigBee protocol that allows devices in the home to communicate with a smart meter and neighborhood hub.

In an embodiment of the present invention, the electrical distribution companies may analyze the electrical consumption data collected over a specified period for better management of energy. The intelligent communications device 102 may include a communication link with a database for storing electrical consumption data. In an embodiment, the specified period may be an hour, a day, a month, a year, or any combination of these.

The intelligent communications device 102 may facilitate interoperability among smart grid devices, thereby facilitating seamless deployment of smart devices in a smart grid. In this aspect, various smart devices including smart appliances and smart meters may work in harmony with the intelligent communications device 102. Thus, the intelligent communications device 102 may integrate into the existing smart grid deployment without competing with other existing devices. Alternatively, it may enhance the capability of other smart devices. In an embodiment of the invention, the intelligent communications device 102 may allow integration with other devices without the need for installing additional devices and/or interface circuitry. The smart devices can be configured with the intelligent communications device 102 for management of smart appliances for increasing the operational efficiency of the smart grid. Smart appliances refer to the class of products that enable communication with smart meters and neighborhood hub for saving energy.

The intelligent communications device 102 may enable Internet Protocol based communication involving end-to-end connectivity on a public wireless network. The intelligent communications device 102 may further facilitate two-way delivery of real-time energy usage data over a public wireless network. In an embodiment, the real-time data may include location information along with energy usage information.

In an embodiment of the present invention, the intelligent communications device 102 may include one or more communication ports for connecting to different types of communication devices. The intelligent communications device 102 may include switches, hubs or other interface circuitry for coupling with the external devices. Additionally, the intelligent communications device 102 may include a wireless communication module for connecting with wireless appliances and/or smart devices. In this aspect, the wireless devices such as smart appliances may be enabled by low power protocol such as 6 LOWPAN. Alternatively, the wireless devices may be enabled using Bluetooth, EDGE, IEEE 802.11, and/or infrared.

Open Standards Implementation

The intelligent communications device 102 may implement open standards to leveragie existing programs and tools. In this aspect, the intelligent communications device 102 may facilitate rapid application deployment and delivery of the new functionality. For example, the intelligent communications device 102 may update the applications and/or programs in real time. Additionally, updates corresponding to programs and/or applications may be executed at a predefined time in order to update the software, drivers, interface ports, applications. This may ensure that the intelligent communications device 102 may be fully equipped to deny any security attack on it. In another example, interfacing a new smart device with the intelligent communications device 102 may initiate a search for software. Failure to discover appropriate software may result in searching the required software at a remote location such as the Internet. Thus, the intelligent communications device 102 may perform self-healing by automatically scanning and integrating new devices and/or facilities in the smart grid infrastructure.

Enclosure

Figure 3A:
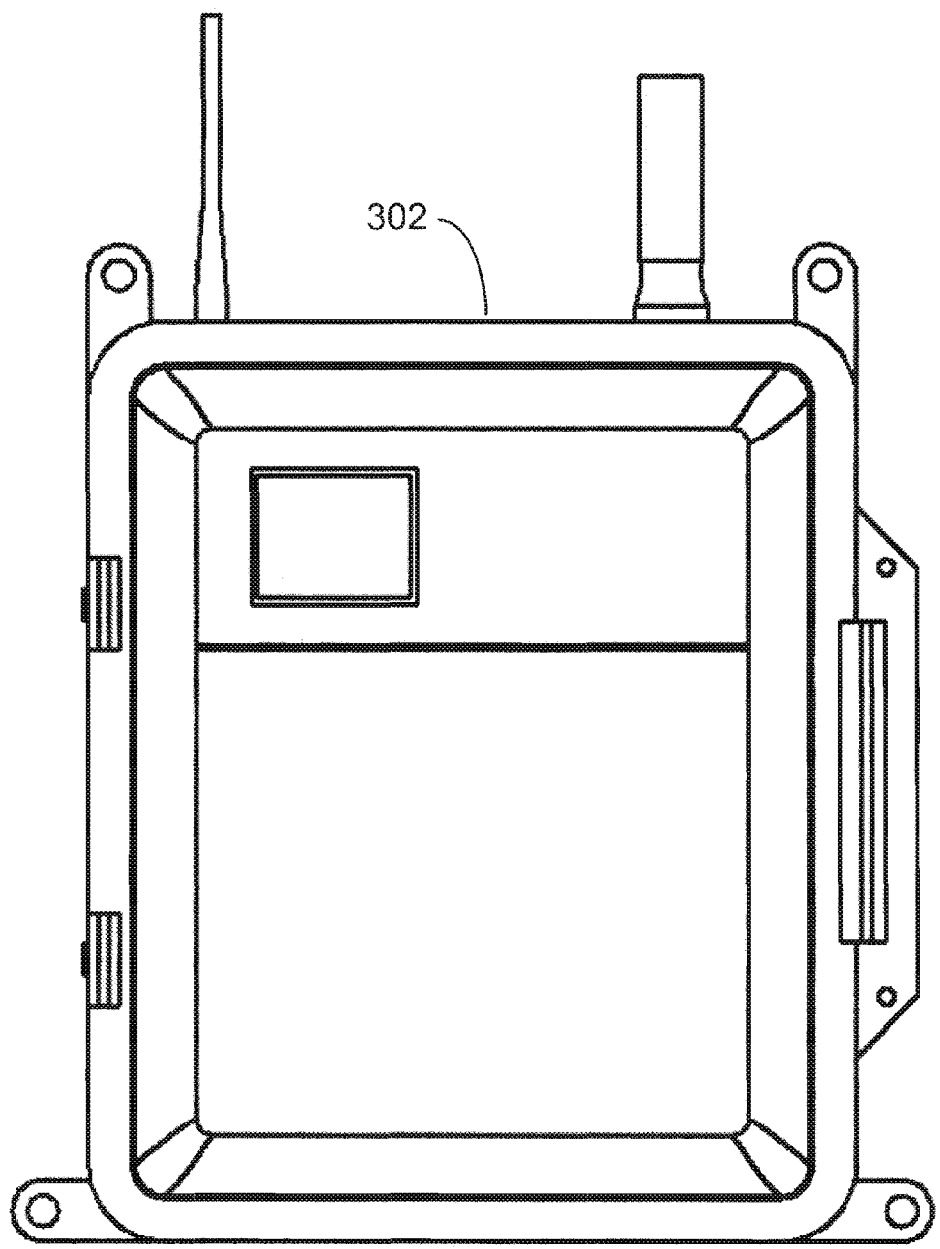
FIG. 3 depicts various modules associated with an intelligent communications device according to one embodiment of the present invention.

Referring to FIG. 3A, an outer enclosure 302 associated with the intelligent communications device 102 is shown, according to one embodiment of the present invention. The intelligent communications device 102 may be enclosed in proper casing 302 for rapid deployment. In this embodiment, the modular and compact design of the intelligent communications device 102 may protect it from damage during installation. The modular design may further enable rapid installation of intelligent communications device 102. For example, the compact modular design may facilitate installation of the intelligent communications device 102 within a small space.

In embodiments, the enclosure may be fabricated from metal, plastic, and other materials, which may be combined.

The compact modular design of the enclosure may be modified for installation in hazardous areas such as refineries, gas plants, and CNG stations. Special enclosures may be provided for installing the intelligent communications device 102 in hazardous areas. In an embodiment of the present invention, the casings and/or enclosures may facilitate a long operational lifetime of the intelligent communications device 102.

Figure 3B:
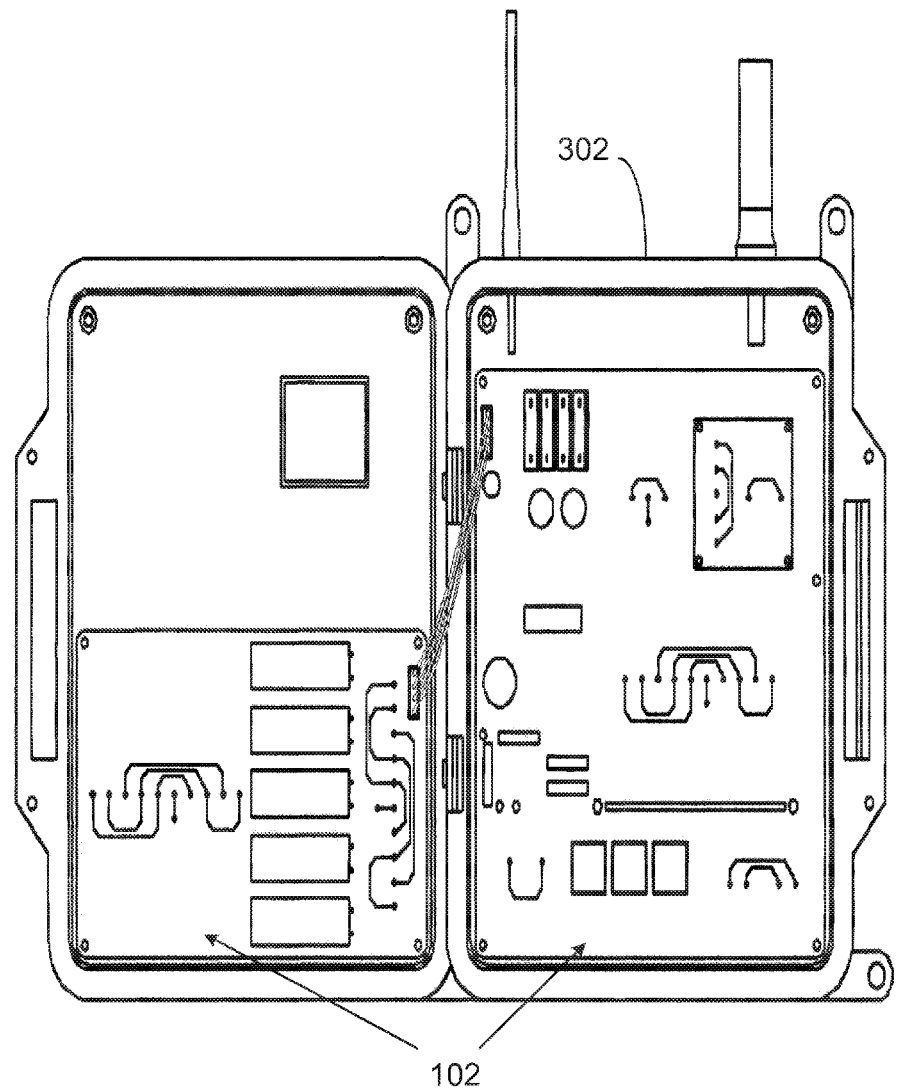

FIG. 3B depicts various circuit boards of the intelligent communications device 102 embedded in the enclosure 302 for safety. The enclosure may include circuitry 306, 308 to raise an alarm if the enclosure is tampered with by an unauthorized entity. Additionally, a provision may be provided in the apparatus that may intelligently determine if the enclosure is opened for repair through an authorized entity.

Management Tools

The intelligent communications device 102 may be interfaced with standard off-the-shelf network management tools. In an embodiment of the present invention, the management tools may be integrated in one or more utilities. Alternatively, the management tools may be implemented on computing devices such as personal computers, servers, and/or electrical control panels.

The intelligent communications device 102 may work in harmony with other smart devices in order to create a seamless infrastructure and to enhance the capability of the smart grid infrastructure. Thus, the intelligent communications device 102 may allow reclosers from one vendor to be integrated with the electronic meters from another vendor for building a collaborative smart grid infrastructure.

The intelligent communications device 102 may implement open source and may facilitate two-way delivery of real-time energy usage data over public wireless network. Further, the open source may simplify deployment of the smart devices in a smart grid infrastructure.

Security Features

In an embodiment of the present invention, the intelligent communications device 102 may secure communication between the intelligent communications device 102 and the external smart devices. For this purpose, the intelligent communications device 102 may implement various security algorithms as known in the art, including IP security and cryptography for secure transfer of data. Internet Protocol Security (IPsec) is a protocol suite for securing Internet Protocol (IP) communications by authenticating and encrypting each IP packet of a data stream. In another embodiment, the intelligent communications device 102 may implement RSA algorithm for securing data transfer.

In embodiments, the intelligent communications device 102 may facilitate collaboration between various interconnected equipment in the smart grid infrastructure. For example, the intelligent communications device 102 may facilitate collaboration between groups of consumers. In another example, the intelligent communications device 102 may facilitate collaboration between different electrical appliances belonging to a particular consumer. In yet another example, the intelligent communications device 102 may facilitate optimization and collaboration of electricity usage related to a particular electrical appliance, for example, a consumer washing machine.

The transmission aspect may be focused on surveillance, fault management, and/or voltage regulation, among others. The intelligent communications device 102 includes software and/or applications for monitoring and surveillance, fault management, and/or voltage regulation. Reports of unusual activity detected by the intelligent communications device 102 may be forwarded to a control station or to security staff via alert. The recorded data may be recorded in a log file, which may be forwarded to the concerned authority in real-time for remedial action. Alternatively, the intelligent communications device 102 may, based on its own capability, resolve the issue without raising an alert.

The distribution aspect may include among other aspects monitoring and management of switches, meters, and/or reclosers. The intelligent communications device 102 may allow integration of various devices into seamless smart grid configuration. For example, a meter from one vendor may be configured with the recloser from another vendor. By implementing open standards in the intelligent communications device 102, the distribution companies can focus on building the smart grid infrastructure without worrying about the product working on a dedicated technology, since the intelligent communications device 102 may act as a universal hub for integrating various technologies.

A consumer may utilize the intelligent communications device 102 for conserving electrical consumption. In this aspect, consumer devices may be directly connected with the intelligent communications device 102. Exemplary consumer devices may include transformers, fault management devices, power meters, water meters, gas meters, load limiters, and disconnect switches. The intelligent communications device 102 may manage these smart devices in an optimum manner for saving electricity.

Solar Power

In an embodiment of the present invention, the intelligent communications device 102 may be solar powered. The outer enclosure of the intelligent communications device 102 maybe fitted with photovoltaic cells that may receive solar energy. The solar energy may be utilized to charge one or more batteries; the charged batteries may allow communication with utility management infrastructure even during a power failure. Thus, the apparatus may work continuously without interruption.

Solar power may be further utilized to provide power for critical activities during a power failure, such as clock, wireless facility, memory and other communication circuitry.

Computer-Executable Software Embodiments

In an embodiment of the present invention, the intelligent communications device 102 may include software and hardware for implementing virtualization. For example, the intelligent communications device 102 may implement hardware virtualization. Implementing virtualization may facilitate the process of disaster recovery, induce higher levels of abstraction, and increased level of security.

In yet another embodiment of the present invention, the intelligent communications device 102 may include software for implementing distributed computing architecture. For example, various software processes may communicate with databases/repositories of the central control station to periodically update the repositories and/or databases. Such an arrangement may reduce the probability of loss of data during disaster and/or failure of other equipment.

In yet another embodiment of the present invention, the software-implemented multiple processes enable processing of data in real time. In this aspect, the software executed by the associated processor may spawn multiple threads for faster execution and real-time monitoring of the utilities. Such implementation may facilitate quick response to adverse events, thereby reducing the probability of failure of the overall infrastructure.

Figure 3C:
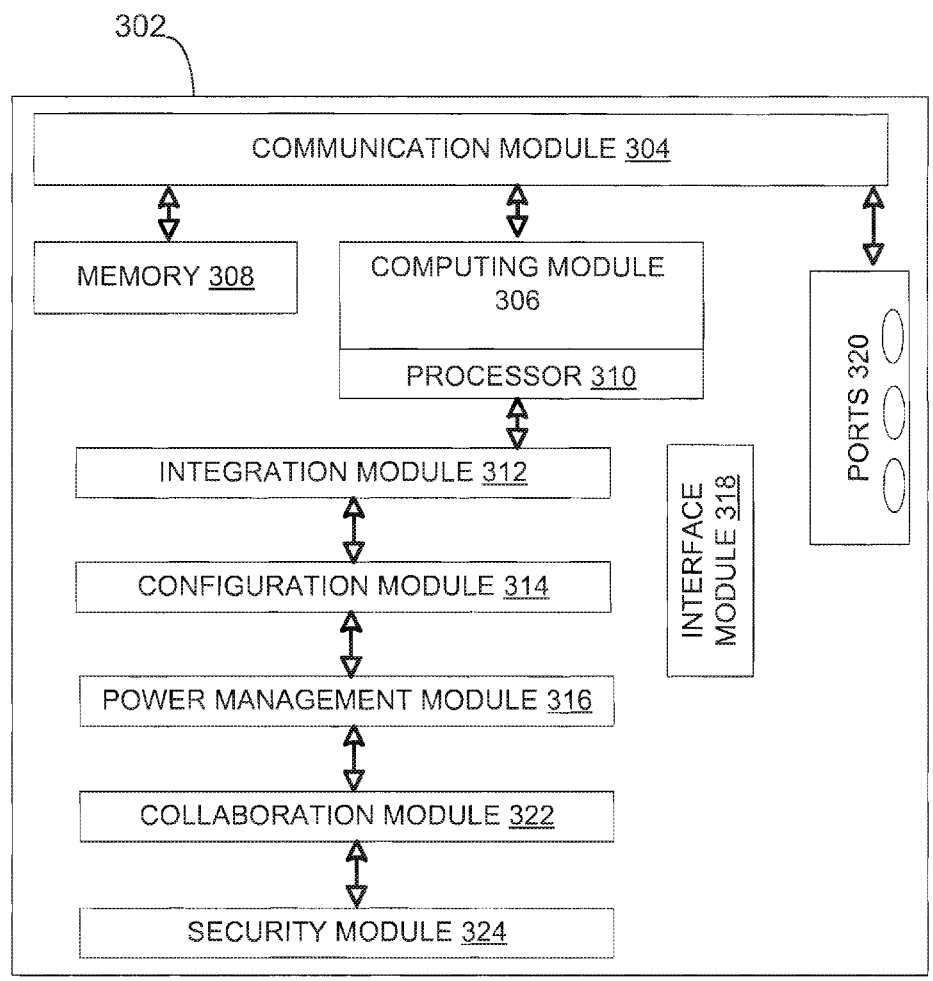

Referring to FIG. 3C, the intelligent communications device 102 may include an enclosure 302, a communication module 304, a memory 308, and a computing module 306 having a processor 310. The communication module 304 may be coupled with the memory 308 and to the computing module 306. In addition, the computing module 306 may be associated with the integration module 312 as well as interface module 318. The smart devices and/or facilities may be attached at one or more ports 320. The data received at one or more ports 320 may be forwarded to an integration module 312, a configuration module 314, a power management module 316, and the collaboration module 322. Additionally, smart devices may be incorporated into the smart grid infrastructure using a collaboration module 322.

In an embodiment of the present invention, addition of a device at one of the ports 320 may initiate integration of the device into the smart grid infrastructure. The signal received from the device may be forwarded to the interface module 318 to determine the type of device, attributes, and other details for integration with the intelligent communications device 102. Once the parameters of the devices have been ascertained, the integration module 312 and the configuration module 314 may facilitate integration for incorporating the device into the smart grid infrastructure. For example, the configuration module 314 may search for device drivers, applications and other software that may enable smooth adaptation of the device into the smart grid infrastructure.

In an embodiment of the present invention, a security module 324 may secure communication between the external smart devices and/or various facilities. For example, the security module may use encryption techniques known in the art for protecting data. Likewise, different security protocols may be implemented by the security module 324 for protecting data.

Figure 4:
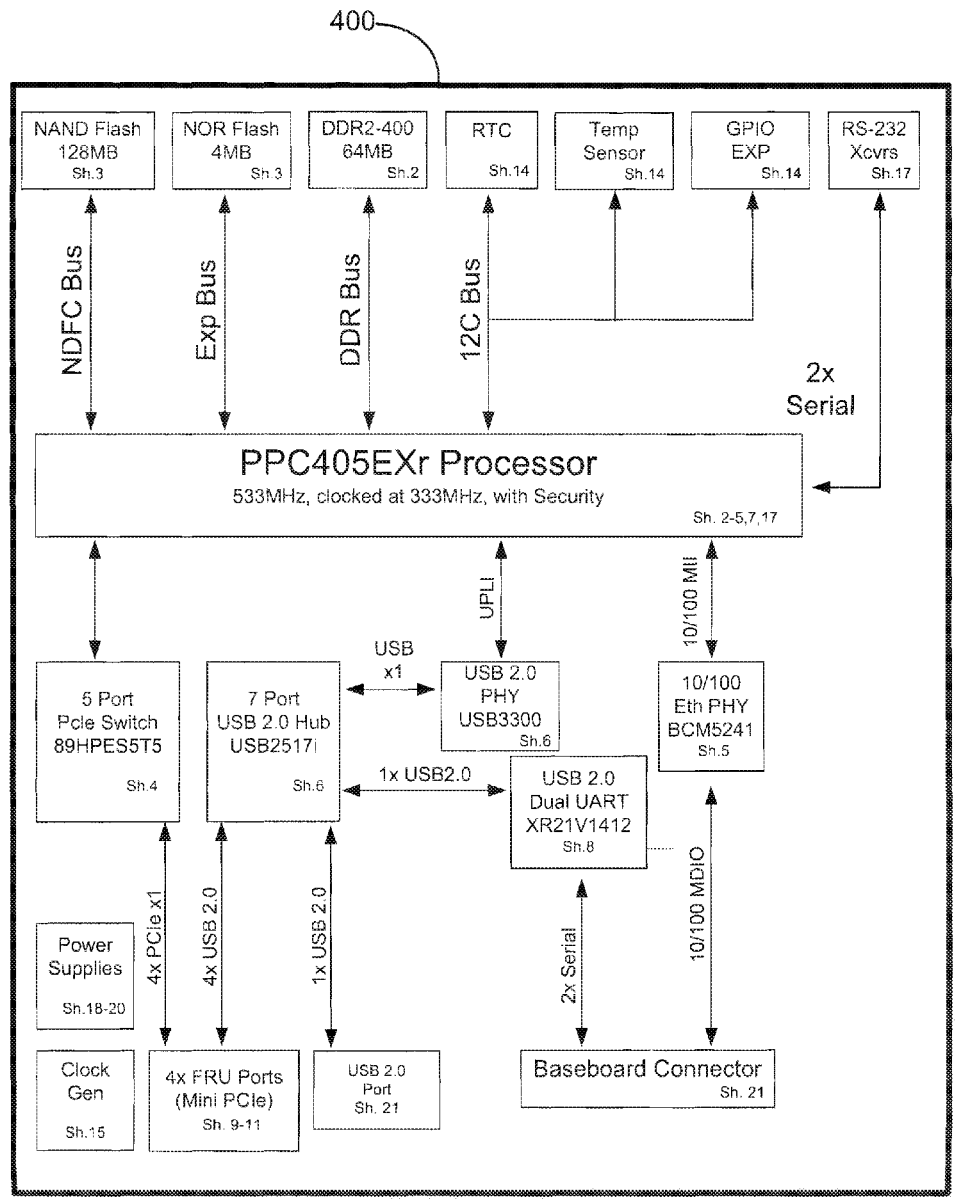
FIG. 4 schematically shows operative circuitry for an intelligent communications device according to one or more embodiments of the present invention.

Referring to FIG. 4, an exemplary outlay 400 of an intelligent communications device 102 is shown, according to one embodiment of the present invention. The internal configuration of the apparatus 400 may include a NAND flash, a NOR flash, a RAM, Temperature sensor, a, RTC, a GPIO, and an interface circuitry such as RS232 coupled to the processor, such as PPC405 EXr Processor. Additionally, a plurality of ports may be interfaced with the processor, such as USB ports, Ethernet ports, switch input connectors, and/or hubs. The circuitry may receive AC/DC power from the power supply, and the power supply may deliver different voltages such as +5V, −5V, +12V, −12V, +15V, −15V and other voltages. Various connectors may be utilized for connecting different type of active and passive components. A clock generation circuitry may be provided for servicing circuits requiring clock pulses.

In an embodiment of the present invention, integrated circuits may be utilized for assembling the embodiment shown in FIG. 4 in association with other active and passive electronic components. Additionally, the circuitry may be laid on a multiple tier PCB for laying the passive and active electronic components and circuits.

Adaptive Heating

Figure 5:
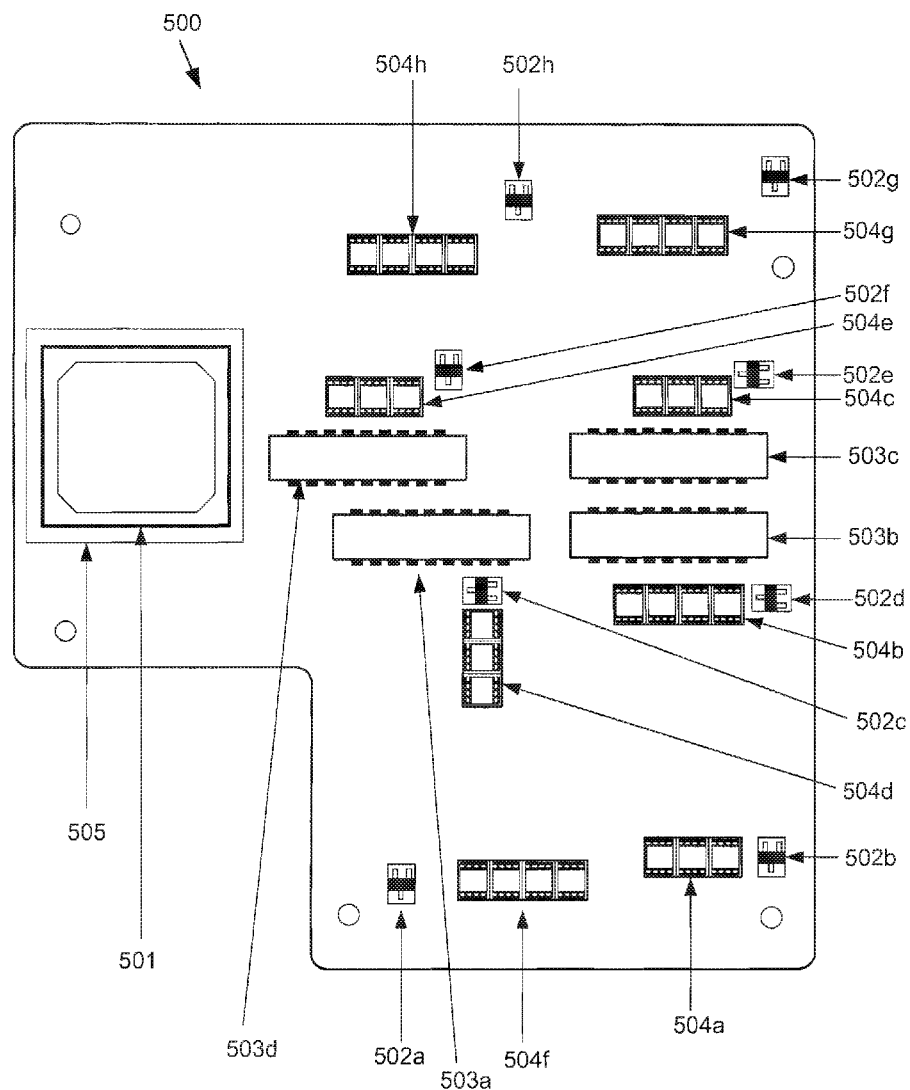
FIG. 5 shows a top view of a printed circuit board having an arrangement of heating elements and temperature sensors according to one embodiment of the present invention.

FIG. 5 shows a top view of a main circuit board 500 having an arrangement of heating elements and temperature sensors, according to one embodiment of the present invention. In one embodiment, the main circuit board 500 is mounted in a protective enclosure, such as a utility-grade enclosure as shown in FIG. 3. A programmable processor 501 is mounted on the main circuit board 500, and four expansion slots or secondary circuit board connectors 503a, 503b, 503c and 503d (collectively referred to as 'connectors 503') are also mounted on the main circuit board 500. The expansion slots can be selected from variety of secondary circuit board connectors available, such as PCIe mini express slots. As shown, the secondary circuit board connectors 503 are mounted on the PCB 500 in a central region of the main circuit board 500, and are configured in two pairs having a first pair of expansion slots and second pair of expansion slots.

In the embodiment shown in FIG. 5, the secondary circuit board connectors 503 are operative to connect secondary circuit boards to the main circuit board 500. In one embodiment, the secondary circuit board connectors 503 include at least one secondary circuit board connection slot operative to receivably mount and operatively couple a secondary circuit board to the main circuit board 500.

The secondary circuit board connectors 503 in each pair are configured in a spaced apart configuration so that secondary circuit boards of various dimensions can be mounted on each of the pair. The secondary circuit boards are mounted in a plane parallel arrangement to the main circuit board or printed circuit board 500. Various types of secondary circuit boards can be mounted upon the secondary circuit board connectors 503.

In the embodiment shown, the secondary circuit boards are operatively coupled to the secondary circuit board connectors 503 and thereby are operatively connected to the main circuit board 500. An array of heating elements 504a, 504b, 504c, 504d, 504e, 504f, 504g and 504h (collectively referred to as 'heating elements 504') are disposed in various locations on the main circuit board 500, including locations proximate secondary circuit board connectors. For example, heating element 504b is mounted proximate secondary circuit board connector 503b, and heating element 504c is mounted proximate secondary circuit board connector 503c. In one embodiment, the heating elements 504 are low-ohmage, ceramic surface mount resistors, such as low power resistors having a rating of quarter watt or half watt. The heating elements 504 are configured in such a manner to, when actuated, distribute heat evenly across the one or more secondary circuit board(s) mounted on the secondary circuit board connector(s) 503. In one embodiment, the heating elements 504 are disposed underneath mounted secondary circuit boards.

In one embodiment, the secondary circuit board connectors 503 are configured to operatively couple secondary circuit boards such that the secondary circuit boards are disposed in a substantially parallel arrangement along the main circuit board 500.

In the embodiment shown in FIG. 5, temperature sensors 502a, 502b, 502c, 502d, 502e, 502f, 502g and 502h (collectively referred to as 'sensors 502') are configured on the main circuit board 500 in a predetermined position relative to secondary circuit boards mounted on the secondary circuit board connectors 503. In one embodiment, the temperature sensors 502 are PN junction diodes. The temperature sensors 502 are configured such as to be located under each secondary circuit board so that the temperature can be monitored for each device mounted on the connector slots 503. In one embodiment, each one of the plurality of secondary circuit board connectors 503 has at least one corresponding temperature sensor 502 and at least one corresponding proximate heating element 504.

As shown in the embodiment of FIG. 5, a temperature sensor circuit 505 is operatively connected to the temperature sensors 502. The temperature sensor circuit 505 is operative to sense temperature through the temperature sensors 502. In one embodiment, the sensor circuit 505 senses temperature through the sensors 502 such that remote temperature sensing is performed. The programmable processor 501 is operatively coupled to the temperature sensor device 505, the temperature sensors 502, and the actuatable heating elements 504. The programmable processor 501 may communicate through one or more data communication protocols, such as Inter-Integrated Circuit (I2C).

The programmable processor 501 is configured to periodically check temperature through temperature sensors 502. In one embodiment, temperature is sensed for the overall ambient temperature within the enclosure, as well as for one or more particular locations on the main circuit board 500 such as at one or more particular secondary circuit board connector 503. In one embodiment, each of the secondary circuit board connectors 503 has a modifiable requisite temperature range which corresponds to a predetermined safe operating temperature range of one or more types of secondary circuit boards that can be operatively coupled to a particular secondary circuit board connector. The requisite temperature range for a particular secondary circuit board connector is modifiable by the programmed processor 501. In one embodiment, the programmable processor 501 is operative to determine whether one or more selected heating elements 504 are to be actuated or deactivated in response to a sensed temperature, which can be based upon a requisite temperature range for a particular circuit board connector 503 or secondary circuit board operatively coupled to the connector 503 in relation to a temperature sensed within the enclosure and/or a temperature sensed at one or more particular connectors 503 and/or locations on the main circuit board 500. Further, the programmable processor 501 is operative to determine whether the system is to be halted or rebooted based on sensed temperature conditions.

Figure 6A:
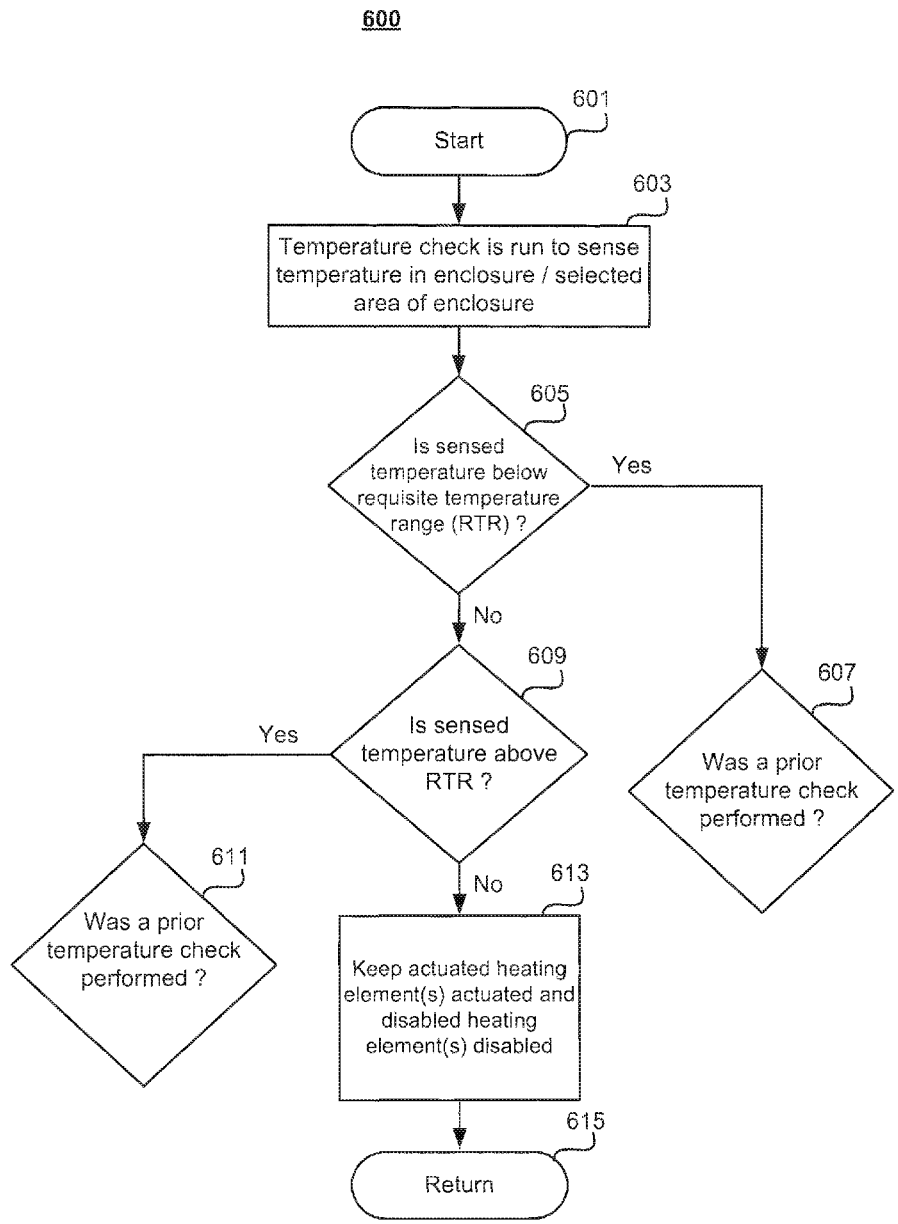
FIG. 6A is a flow chart illustrating operational steps of a routine for performing temperature measurement and response, according to one embodiment of the present invention.
Figure 6B:
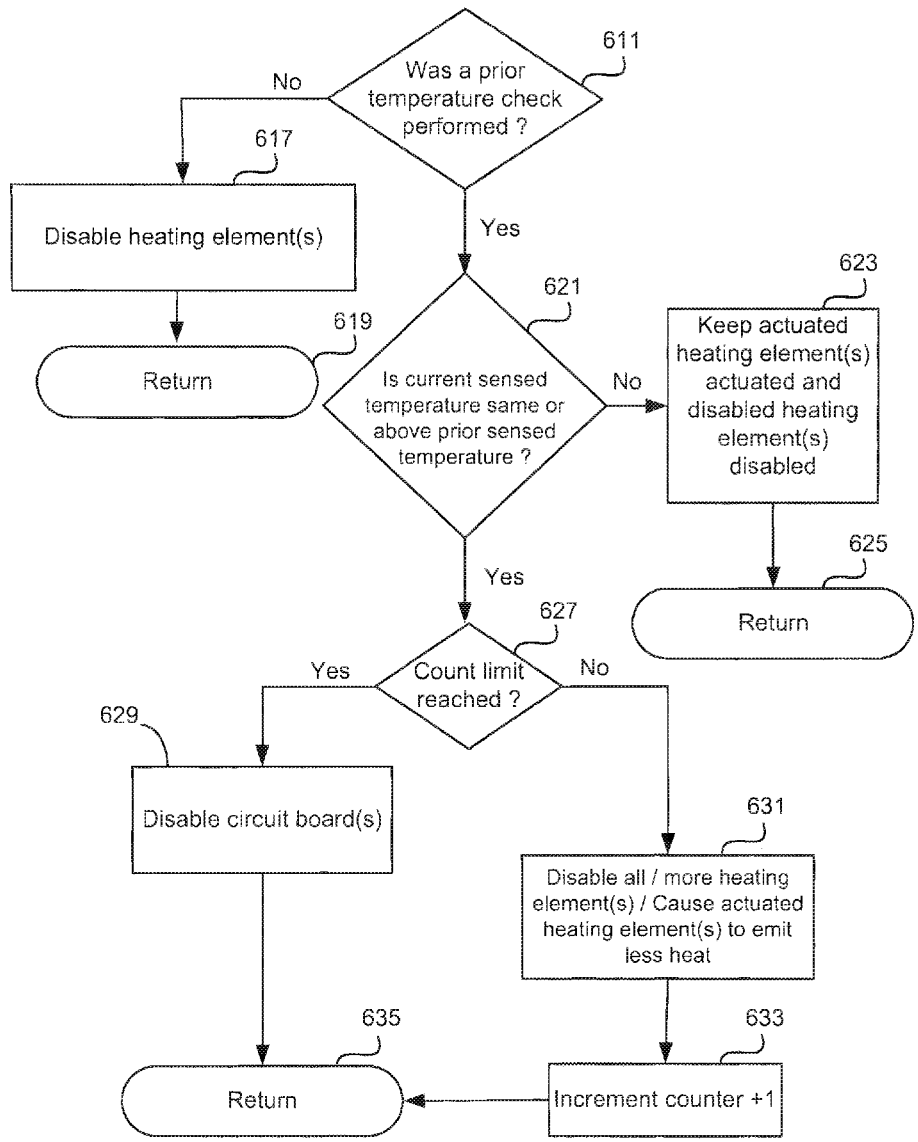
FIG. 6B is a flow chart illustrating operational steps of a particular aspect of the routine shown in the flow chart of FIG. 6A, according to one embodiment of the present invention.
Figure 6C:
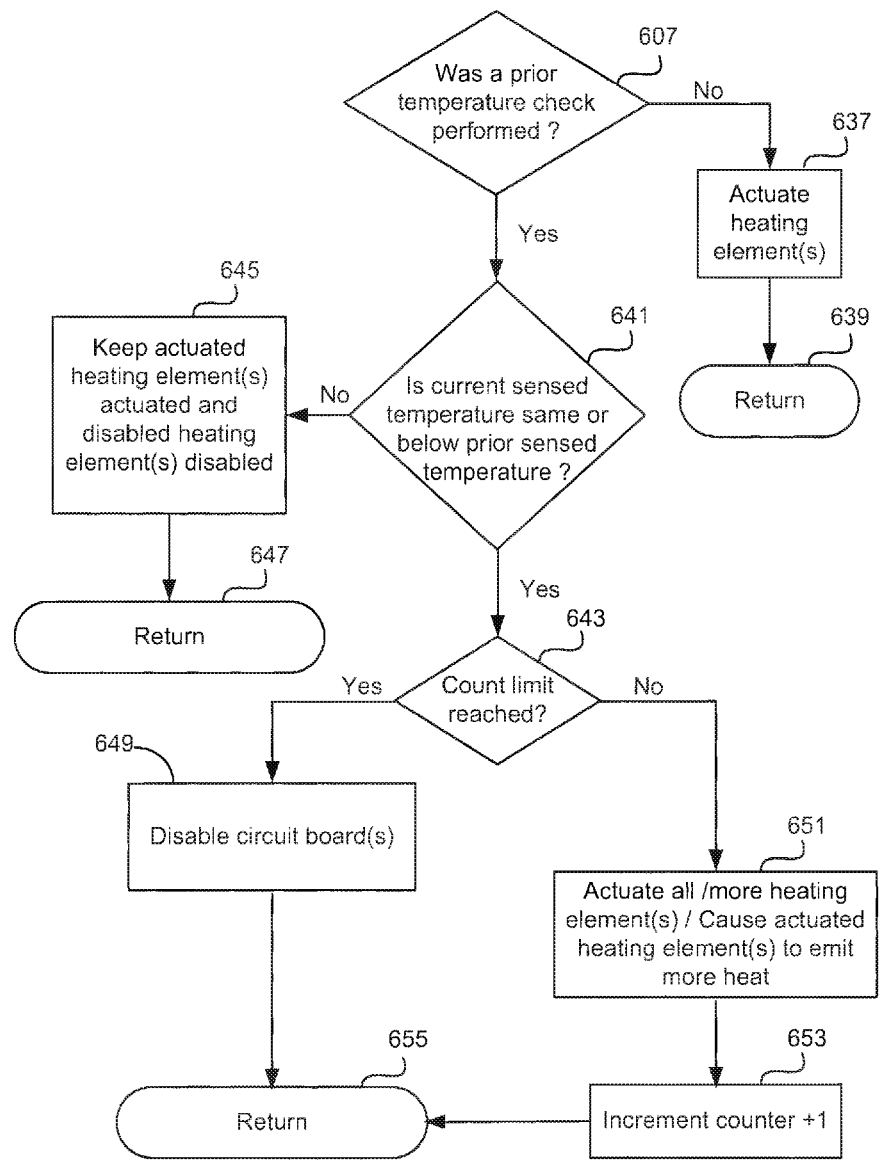
FIG. 6C is a flow chart illustrating operational steps according to another particular aspect of the routine shown in the flow chart of FIG. 6A, according to one embodiment of the present invention.

FIGS. 6A, 6B, and 6C illustrate a flow chart of operational steps of a routine 600 for monitoring and regulating temperature, according to one embodiment of the present invention. In one or more embodiments, the routine may be executed by the processor 501, for example according to computer-executable instructions on a computer-readable medium which, when executed by the processor, cause a computer to perform the operational steps.

Referring now to FIG. 6A, routine 600 starts at 601, and then at step 603 a temperature check is performed for the overall temperature within the enclosure (see FIG. 3) and/or for particular selected area(s) of the main circuit board 500. The temperature check step is repeatable in a cycle after a predetermined period of time and/or following a particular series of conditions and determinations.

From step 603, operation moves to step 605, where it is determined whether the temperature sensed at step 603 is below a predetermined requisite temperature range, such as a safe operating temperature range for a secondary circuit board operatively coupled to the main circuit board 500. If it is determined at step 605 that the sensed temperature is below the requisite temperature range, then operation proceeds along the "Yes" path to step 607. If at step 605 it is determined that the sensed temperature is not below the requisite temperature range, then operation proceeds along the "No" path to step 609. At step 609, a determination is made whether the sensed temperature is above the requisite temperature range. If it is determined at step 609 that the sensed temperature is above the requisite temperature range, then operation proceeds along the "Yes" path to step 611. If it is determined at step 609 that the sensed temperature is not above the requisite temperature range, then operation proceeds along the "No" path to step 613, where one or more actuated heating elements are kept in an actuated state, and one or more disabled heating elements are kept in a disabled state, and then operation proceeds to step 615. At step 615, operation cycles back to the start 601 of the routine 600.

Now referring to FIGS. 6A and 6B, as set forth above, a determination is made at step 611 whether a prior temperature check was performed. If at step 611 it is determined that a prior temperature check was not performed, then operation proceeds along the "No" path to step 617, where one or more heating elements are disabled. Operation then continues from step 617 to step 619, where operation cycles back to the start of the routine at step 601, shown in FIG. 6A. If at step 611 it is determined that a prior temperature check was performed, then operation proceeds along the "Yes" path to step 621. At step 621, a determination is made whether the current sensed temperature is the same as or above the temperature sensed in the prior temperature check. If it is determined at step 621 that the current sensed temperature is not the same as or above the prior sensed temperature, then operation proceeds along the "No" path to step 623. At step 623, any actuated heating elements are kept in an actuated state, and any disabled heating elements are disabled, then at step 625, operation cycles back to start again at step 601.

An incremental counter is operative to count each iteration of sensing the temperature in the case where one or more prior temperature checks have been performed, up to a predetermined count limit. If at step 621 it is determined that the current sensed temperature is the same as or above the prior sensed temperature, then operation proceeds along the "Yes" path to step 627, where a determination is made whether the predetermined count limit has been reached. If it is determined that the count limit has been reached, operation proceeds along the "Yes" path to step 629, where one or more active circuit boards are disabled. From step 629, operation continues to step 635, where the operation cycles back to the start of the routine at step 601, shown in FIG. 6A. If at step 627 it is determined that the count limit has not been reached, then operation proceeds along the "No" path to step 631. At step 631, one or more actuated heating elements are disabled and/or caused to emit less heat. From step 631, operation proceeds to step 633, where the count is incremented by one, and then to step 635, where operation cycles back to the start of the routine 600 at step 601, shown in FIG. 6A.

Now referring to FIGS. 6A and 6C, at step 607, it is determined whether a prior temperature check has been performed or if the current instance is the first temperature check performed. If it is determined at step 607 that a prior temperature check was not performed, then operation proceeds along the "No" path from step 607 to step 637, where one or more selected heating elements are actuated to operatively emit heat, and operation then proceeds to step 639. At step 639, operation cycles back to step 601 shown in FIG. 6A. If at step 607 it is determined that a prior temperature check was performed, then operation proceeds from step 607 along the "Yes" path to step 641. At step 641, a determination is made whether the current sensed temperature is the same as or below the temperature sensed at the prior temperature check. If it is determined at step 641 that the current sensed temperature is not the same as or below the prior sensed temperature, meaning that the sensed temperature has increased since the last check was performed, then at step 645, operation proceeds along the "No" path to step 645, where any currently activated heating elements are kept in the actuated state and any currently disabled heating elements are kept in a disabled state. From step 645, operation continues to step 647, where the routine cycles back to the beginning at step 601 shown in FIG. 6A. If at step 641 it is determined that the current sensed temperature is the same as or below the prior sensed temperature, meaning that the sensed temperature remains below the requisite temperature range, then operation proceeds along the "Yes" path to step 643.

An incremental counter is operative to count each iteration of sensing the temperature in the case where one or more prior temperature checks have been performed, up to a predetermined count limit. Now referring again to step 643, if the count limit has been reached, then operation proceeds along the "Yes" path to step 649, where one or more secondary circuit boards are selectively disabled. Subsequently, at step 655, operation cycles back to the start of the routine 600 at step 601. If at step 643 it is determined that the predetermined count limit has not been reached, then operation proceeds along the "No" path to step 651. At step 651, one or more additional heating elements are actuated, as compared to the number of heating elements actuated in the previous iteration of the cycle. Additionally or alternatively at step 651, the heating elements already actuated and/or any additional heating elements actuated can be caused to emit more heat. From step 651, operation proceeds to step 653, where the count is incremented by one, and then at step 655, operation cycles back to the start of the routine 600 at step 601.

In one or more embodiments, the requisite temperature range is determined taking hysteresis into account. An already heated heating element 504, upon being disabled, will continue to emit some amount of heat for a period of time after being disabled, before returning to a state where it can be considered as having cooled off relative to the predetermined requisite temperature range. Accordingly, immediately after a previously actuated heating element is disabled, it will continue heating the particular location inside the enclosure as well as the enclosure for a limited period of time, and hence it will not be required to switch on the heating elements as soon as the sensed temperature falls below the RTR as heating elements may still be emitting heat despite being switched off. This is in the interest of power management. The hysteresis characteristic of the heating elements is used in power management and also in preventing frequent switching on and off of the heating element(s) 504. For determining the predetermined requisite temperature range, the fact that the disabled heating elements will continue to emit heat for some time has been considered.

The methods described herein may be deployed in part or in whole through one or more devices that are capable of executing computer software, program codes, and/or instructions on corresponding processors. A processor may be part of a server, client, network infrastructure, mobile computing platform, stationary computing platform, or other computing platform. The processor may be any kind of computational or processing device capable of executing program instructions, codes, and/or binary instructions. The processor may be or may include a signal processor, a digital processor, an embedded processor, a microprocessor or any variant such as a co-processor (e.g. a math co-processor, a graphic co-processor, and/or a communication co-processor), that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program and instructions are described herein may be implemented in one or more threads. A thread may spawn other threads that may have assigned priorities associated with them; the processor may execute these threads based on a priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other types of instructions capable of being executed by the computing or processing device may include, but may not be limited to, one or more of a CD-ROM, DVD, memory, hard disk, flash drive, RAM, ROM, and/or cache.

The processor may include one or more cores that may enhance speed and performance of a multiprocessor. In embodiments, the process may be a dual core processor, quad core processors, or other chip-level multiprocessors that combine two or more processors.

The methods and systems described herein may transform physical and/or or intangible items from one state to another. The methods and systems described herein may also transform data representing physical and/or intangible items from one state to another.

The elements described and depicted herein, including the elements described in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, and/or routers. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs steps thereof. In another aspect, the methods may be embodied in systems that perform steps thereof, and may be distributed across devices in a number of ways, or all of the functionality may be integrated into a dedicated, standalone device or other hardware. In another aspect, the means for performing steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples.

What is claimed is:

1. An apparatus for controlling the operations of temperature-sensitive electronic devices in an enclosure based on a requisite temperature range, the apparatus comprising:
a main circuit board having plurality of secondary circuit board connectors operative to connect secondary circuit boards to the main circuit board;
one or more temperature sensors operative to sense temperature within the enclosure;
one or more selectively actuatable heating elements mounted to the main circuit board in proximity to the plurality of secondary circuit board connectors, each heating element operative to emit heat when actuated; and
a programmable processor, wherein the one or more temperature sensors and the one or more heating elements are operatively connected to the processor, and wherein the processor is programmed to,
cause the one or more temperature sensors to sense the temperature within the enclosure and,
if the sensed temperature within the enclosure is below the requisite temperature range, actuate at least one of the heating. elements, and set an incremental counter operative to count each iteration of sensing the temperature, and actuate at least one more of the heating elements, up to a predetermined count limit and,
if the sensed temperature within the enclosure is below the requisite temperature range when the incremental counter reaches the count limit, selectively disable corresponding connected secondary circuit boards; and
if the sensed temperature is above the requisite temperature range, selectively disable at least one of the heating elements.

2. The apparatus of claim 1, wherein the programmable processor is further programmed to, after the at least one of the heating elements is actuated, sense the temperature within the enclosure again and, if the sensed temperature is within the requisite temperature range, keep the at least one of the actuated heating elements actuated to emit heat.

3. The apparatus of claim 1, wherein the programmable processor: is further programmed to, after the at least one of the heating elements is disabled, sense the temperature within the enclosure again and, if the sensed temperature is within the requisite temperature range, keep the disabled at least one of the heating elements disabled.

4. The apparatus of claim 1, wherein each one of the plurality of secondary circuit board connectors has at least one corresponding temperature sensor and at least one corresponding heating element disposed in proximity thereto.

5. The apparatus of claim 1, wherein the processor is further programmed to,
if the temperature sensed at a particular one of the plurality of secondary circuit board connectors is below the requisite temperature range actuate at least one heating element proximate to that secondary circuit board, and
if the temperature sensed at a particular one of the plurality of secondary circuit board connectors is above the requisite temperature range, selectively shut down at least one heating element proximate to that secondary circuit board.

6. The apparatus of claim 1, wherein each of the plurality of secondary circuit board connectors has a requisite temperature range that corresponds to a predetermined safe operating temperature range of a secondary circuit board operatively coupled to that particular connector, and wherein the requisite temperature range for the particular connector is modifiable by the programmable processor.

7. The apparatus of claim 6, wherein the requisite temperature range corresponds to a safe operating temperature range of at least one circuit board operatively coupled to a corresponding one of the plurality of secondary circuit board connectors.

8. The apparatus of claim 1, wherein each one of the plurality of secondary circuit board connectors has a corresponding requisite temperature range that is dynamically modifiable by the programmable processor according to a predetermined safe operating temperature corresponding to the type and function of the particular secondary circuit board operatively connected to the connector.

9. The apparatus of claim 1, wherein the plurality of secondary circuit hoard connectors are configured to operatively couple secondary circuit boards thereto such that the secondary circuit boards are disposed in a substantially parallel arrangement along the main circuit board.

10. The apparatus of claim 1, wherein at least one of the plurality of secondary circuit board connectors comprises a secondary circuit board connection slot operative to receivably mount and operatively couple a secondary circuit board to the main circuit board.

11. The apparatus of claim 1, wherein the one or more temperature sensors comprises a PN junction diode.

12. The apparatus of claim 1 wherein the at least one heating element comprises a low-ohmage surface mount resistor.

13. The apparatus of claim 1, wherein the requisite temperature range has a predetermined hysteresis amount corresponding to at least one of the upper and lower boundaries of the requisite temperature range, wherein the processor is further programmed to selectively actuate or disable at least one of the heating elements when the sensed temperature surpasses the predetermined hysteresis amount.

14. An apparatus for controlling the operations of temperature-sensitive electronic devices in an enclosure based on a requisite temperature range, the apparatus comprising:
 a main circuit board having plurality of secondary circuit board connectors operative to connect secondary circuit boards to the main circuit hoard;
 one or more temperature sensors operative to sense temperature within the enclosure;
 one or more selectively actuatable heating elements mounted to the main circuit board in proximity to the plurality of secondary circuit board connectors, each heating element operative to emit heat when actuated; and
 a programmable processor, wherein the one or more temperature sensors and the one or more heating elements are operatively connected to the processor, and wherein the processor is programmed to,
 cause the one or more temperature sensors to sense the temperature within the enclosure and,
 if the sensed temperature within the enclosure is above the requisite temperature range, disable at least one of the heating elements, and set an incremental counter operative to count each iteration of sensing the temperature, and disable at least one more of the heating elements, up to a predetermined count limit and,
 if the sensed temperature within the enclosure is above the requisite temperature range when the incremental counter reaches the count limit, selectively disable the plurality of corresponding connected secondary circuit boards; and
 if the sensed temperature within the enclosure is below the requisite temperature range, selectively actuate at least one of the heating elements.

15. A method of maintaining a safe operating temperature range of temperature sensitive electronic devices in an enclosure based on temperature within the enclosure, the method comprising:
 operatively connecting a main circuit board having plurality of secondary circuit board connectors operative to connect secondary circuit boards, to the main circuit board;
 configuring one or more temperature sensors to be operative to sense temperature within the enclosure;
 operatively connecting one or more selectively actuatable heating elements to the main circuit board in proximity to the of secondary circuit board connectors, and configuring each heating element to be operative to emit heat when actuated; and
 operatively connecting the one or more temperature sensors and the one or more heating elements to a programmable processor, and programming the programmable processor to,
 cause the one or more temperature sensors to sense the temperature within the enclosure and,
 if the sensed temperature within the enclosure is below the requisite temperature range, actuate at least one of the heating elements, and set an incremental counter operative to count each iteration of sensing the temperature, and actuate at least one more of the heating elements, up to a predetermined count limit and,
 if the sensed temperature within the enclosure is below the requisite temperature range when the incremental counter reaches the count limit, selectively disable corresponding connected secondary circuit boards; and if the sensed temperature is above the requisite temperature range, selectively disable at least one of the heating elements.

16. The method of claim 15, further comprising programming the programmable processor to, after the at least one of the heating elements is actuated, sense the temperature within the enclosure again and, if the sensed temperature is within the requisite temperature range, keep the at least one of the actuated heating elements actuated to emit heat.

17. The method of claim 15, further comprising programming the programmable processor to, after the at least one of the heating elements is disabled, sense the temperature within the enclosure again and, if the sensed temperature is within the requisite temperature range, keep the disabled at least one of the heating elements disabled.

18. The method of claim 15, further comprising disposing at least one temperature sensor and at least one heating element in proximity to each one of the plurality of secondary circuit board connectors.

19. The method of claim 15, further comprising programming the programmable processor to,
 if the temperature sensed at a particular one of the plurality of secondary circuit board connectors is below the requisite temperature range actuate at least one heating element proximate to that secondary circuit board, and if the temperature sensed at a particular one of the plurality of secondary circuit board connectors is above the requisite temperature range, selectively shut down at least one heating element proximate to that secondary circuit board.

20. The method of claim 15, wherein each of the plurality of secondary circuit board connectors has a requisite temperature range that corresponds to a predetermined safe operating temperature range of a secondary circuit board operatively coupled to that particular connector, and wherein the requisite temperature range for the particular connector is modifiable by the programmable processor.

21. The method of claim 20, wherein the requisite temperature range corresponds to a safe operating temperature range of at least one circuit board operatively coupled to a corresponding one of the plurality of secondary circuit board connectors, 22. The method of claim 15, wherein each one of the plurality of secondary circuit board connectors has a corresponding requisite temperature range that is dynamically modifiable by the programmable processor according to a predetermined safe operating temperature corresponding to the type and function of the particular secondary circuit board operatively connected to the connector.

23. The method of claim 15, further comprising operatively coupling the plurality of secondary circuit boards to corresponding secondary circuit board connectors and disposing the secondary circuit boards in a substantially parallel arrangement along the main circuit board.

24. The method of claim 15, configuring a secondary connection slot corresponding to at least one of the plurality of secondary circuit board connectors to be operative to receivably mount and operatively couple a corresponding at eas one of the plurality of secondary circuit boards.

25. The method of claim 15, wherein the one or more temperature sensors comprises a PN junction diode.

26. The method of claim 15, wherein the at least one heating element comprises a low-ohmage surface mount resistor.

27. The method of claim 15, further comprising programming the programmable able processor to selectively actuate or disable at least one of the heating elements when the sensed temperature surpasses the predetermined hysteresis amount.

28. A method of maintaining a safe operating temperature range of temperature sensitive electronic devices in an enclosure based on temperature within the enclosure, the method comprising:
operatively connecting a main circuit board having plurality of secondary circuit board connectors operative to connect secondary circuit boards, to the main circuit board;
configuring one or more temperature sensors to be operative to sense temperature within the enclosure;
operatively connecting one or more selectively actuatable heat elements to the main circuit board in proximity to the plurality of secondary circuit board connectors, and configuring each heating element to be operative to emit heat when actuated; and
operatively connecting the one or more temperature sensors and the one or more heating elements to a programmable processor, and programming the programmable processor to,
cause the one or more temperature sensors to sense the temperature within the enclosure and,
if the sensed temperature within the enclosure is above the requisite temperature range, disable at least one of the heating elements and set an incremental counter operative to count each iteration of sensing the temperature, and disable at least one more of the heating elements, up to a predetermined count limit and,
if the sensed temperature within the enclosure is above the requisite temperature range when the incremental counter reaches the count limit, selectively disable the plurality of corresponding connected secondary circuit boards; and
if the sensed temperature within the enclosure is below the requisite temperature range, selectively actuate at least one of the heating elements.

29. An apparatus for controlling the operations of temperature-sensitive electronic devices in a utility-grade enclosure based on a requisite temperature range, the apparatus comprising:
a main circuit board having plurality of secondary circuit board connectors configured to operatively connect secondary circuit boards to the main circuit board;
a plurality of temperature sensors operative to sense temperature within the enclosure;
a plurality of selectively actuatable resistive heating elements operative to emit heat when actuated and mounted to the main circuit board in proximity to corresponding secondary circuit board connectors; and
a programmable processor, wherein the plurality of temperature sensors and the plurality of heating elements are operatively coupled to the processor and the processor is programmed to,
if the temperature sensed from the plurality of temperature sensors is not within a safe operating temperature range corresponding to one or more secondary circuit boards operatively coupled to corresponding secondary circuit board connectors, actuate or shut down at least one of the heating elements, set an incremental counter operative to count each iteration of sensing the temperature, and selectively actuate or shut down at least one more heating element, up to a predetermined count limit, and
if the temperature sensed from the plurality of temperature sensors is not within the safe operating temperature range corresponding to one or more secondary circuit boards operatively coupled to corresponding secondary circuit board connectors when the incremental counter reaches the count limit, selectively disable one or more secondary circuit boards.

30. The apparatus of claim 29, wherein each one of the plurality of secondary circuit board connectors has one or more corresponding temperature sensors disposed in proximity thereto.

31. The apparatus of claim 29, wherein each of the plurality of secondary circuit board connectors has a requisite temperature range that corresponds to a predetermined safe operating temperature range of a secondary circuit board operatively coupled to that particular connector, and wherein the requisite temperature range for the particular connector is modifiable by the programmable processor according to the type and function of the particular secondary circuit board.

32. The apparatus of claim 29, wherein the requisite temperature range corresponds to a safe operating temperature range of at least one circuit board operatively
coupled to a corresponding one of the plurality of secondary circuit board connectors.

33. The apparatus of claim 29 wherein each one of the plurality of secondary circuit board connectors has a corresponding requisite temperature range that is dynamically modifiable by the programmable processor according to a predetermined safe operating temperature corresponding to the type and function of a secondary circuit board operatively coupled to the connector.

34. The apparatus of claim 29, wherein the plurality of secondary circuit board connectors are configured to operatively couple secondary circuit boards thereto such that the secondary circuit boards are disposed in a substantially parallel arrangement along the main circuit board.

35. The apparatus of claim 29, wherein at least one of the plurality of temperature sensors comprises a PN junction diode.

36. The apparatus of claim 29, wherein at least one of the plurality of secondary circuit board connectors comprises a secondary circuit board connector slot
operative to receivably mount and operatively couple a secondary circuit board to the main circuit board.

37. The apparatus of claim 29, wherein at least one of the plurality of heating elements comprises a low-power surface mount resistor.

38. The rates of claim 29, wherein the requisite temperature range has a predetermined hysteresis amount corresponding to at least one of the upper and lower boundaries of the requisite temperature range, wherein the processor is further programmed to selectively actuate or shut down at least one of the heating elements when the sensed temperature surpasses the predetermined hysteresis amount.

* * * * *

UNITED STATES PATENT AND TRADEMARK OFFICE
CERTIFICATE OF CORRECTION

PATENT NO. : 8,704,630 B2
APPLICATION NO. : 12/899472
DATED : April 22, 2014
INVENTOR(S) : Charles W. Melvin, Jr. et al.

It is certified that error appears in the above-identified patent and that said Letters Patent is hereby corrected as shown below:

In the Claims:

Column 18, line 8 (Claim 3) replace "processor: is" with --processor is--

Column 18, line 48 (Claim 9) replace "hoard" with --board--

Column 20, line 56 (Claim 24) replace "claim 15, configuring" with --claim 15, further comprising configuring--

Column 20, line 58 (Claim 24) replace "eas" with --least--

Column 21, line 14 (Claim 28) replace "heat" with --heating--

Column 22, line 52 (Claim 38) replace "rates" with --apparatus--

Signed and Sealed this
Nineteenth Day of August, 2014

Michelle K. Lee
*Deputy Director of the United States Patent and Trademark Office*